US011501211B2

(12) United States Patent
Wu et al.

(10) Patent No.: US 11,501,211 B2
(45) Date of Patent: Nov. 15, 2022

(54) CHATBOT SYSTEM WITH MODEL LIFECYCLE MANAGEMENT

(71) Applicant: Hong Kong Applied Science and Technology Research Institute Co., Ltd, Shatin (HK)

(72) Inventors: Chi Kong Wu, Tsuen Wan (HK); Ka Wing Ho, Tai Po (HK)

(73) Assignee: HONG KONG APPLIED SCIENCE AND TECHNOLOGY RESEARCH INSTITUTE CO., LTD, Shatin (HK)

( * ) Notice: Subject to any disclaimer, the term of this patent is extended or adjusted under 35 U.S.C. 154(b) by 504 days.

(21) Appl. No.: 16/818,702

(22) Filed: Mar. 13, 2020

(65) Prior Publication Data
US 2021/0287132 A1 Sep. 16, 2021

(51) Int. Cl.
*G06N 20/00* (2019.01)
*G06F 16/23* (2019.01)
*G06F 40/205* (2020.01)
*H04L 51/02* (2022.01)
*G06N 3/00* (2006.01)

(52) U.S. Cl.
CPC ......... *G06N 20/00* (2019.01); *G06F 16/2379* (2019.01); *G06F 40/205* (2020.01); *G06N 3/004* (2013.01); *H04L 51/02* (2013.01)

(58) Field of Classification Search
CPC .... G06N 20/00; G06F 16/2379; G06F 40/205
USPC ........................................................ 706/12
See application file for complete search history.

(56) References Cited

U.S. PATENT DOCUMENTS

| 6,499,024 B1 | 12/2002 | Stier et al. |
| 6,587,847 B1 * | 7/2003 | Stier ...................... G06Q 10/10 706/50 |
| 8,813,206 B2 | 8/2014 | Wu et al. |

(Continued)

FOREIGN PATENT DOCUMENTS

| CN | 109582778 A | 4/2019 |
| WO | WO2016018763 A1 | 2/2016 |

OTHER PUBLICATIONS

International Search Report and Written Opinion regarding PCT/CN2020/080056 dated Dec. 10, 2020, 10 pages.

(Continued)

*Primary Examiner* — Sibte H Bukhari
(74) *Attorney, Agent, or Firm* — Crowell & Moring LLP

(57) ABSTRACT

The present disclosure describes methods, devices, and non-transitory computer readable storage medium for managing lifecycle of a knowledge base (KB) in chatbot systems. The method includes receiving an update request and updating a current-version KB as a new current-version KB. The method also includes receiving a first test request from a knowledge point (KP) operator and determining whether the new current-version KB passes a first test; and in response to the determination that the new current-version KB passes the first test, submitting the new current-version KB as a new submit-version KB. The method further includes receiving a second test request from a KP manager and determining whether the new submit-version KB passes a second test; and in response to the determination that the new submit-version KB passes the second test, storing an original production-version KB as a pervious-version KB and submitting the new submit-version KB as a new production-version KB.

22 Claims, 10 Drawing Sheets

(56) References Cited

U.S. PATENT DOCUMENTS

| | | |
|---|---|---|
| 9,369,410 B2 | 6/2016 | Capper et al. |
| 9,794,199 B2 | 10/2017 | Capper et al. |
| 10,013,980 B2 | 7/2018 | Borsutsky et al. |
| 10,170,106 B2 | 1/2019 | Gelfenbeyn et al. |
| 10,490,186 B2 | 11/2019 | Gelfenbeyn et al. |
| 2014/0280307 A1 | 9/2014 | Gupta et al. |
| 2018/0075335 A1* | 3/2018 | Braz ................. G06F 16/24522 |
| 2018/0337872 A1 | 11/2018 | Fawcett |
| 2019/0140986 A1 | 5/2019 | Anderson et al. |

OTHER PUBLICATIONS

Ilievski et al., Goal-Oriented Chatbot Dialog Management Bootstrapping with Transfer Learning https://arxiv.org/pdf/1802.00500.pdf, 7 pages.

Lee et al., Example-based dialog modeling for practical multi-domain dialog system, Speech Communications 51, ScienceDirect, 2009, 19 pages.

Sheth, The Bot Lifecycle: What to know before you make your chatbot—Chatbots Magazine, 2016, 7 pages.

* cited by examiner

300

```
┌─────────────────────────────────────────────────────────────────┐
│ receiving, by a device comprising a memory storing instructions │
│ and a processor in communication with the memory, an update    │
│ request and updating a current-version KB as a new              │
│ current-version knowledge base (KB);                     310    │
└─────────────────────────────────────────────────────────────────┘
                                │
                                ▼
┌─────────────────────────────────────────────────────────────────┐
│ receiving, by the device, a first test request from a KP        │
│ operator and determining whether the new current-version KB     │
│ passes a first test                                      320    │
└─────────────────────────────────────────────────────────────────┘
                                │
                                ▼
┌─────────────────────────────────────────────────────────────────┐
│ in response to the determination that the new current-version   │
│ KB passes the first test, submitting, by the device, the new    │
│ current-version KB as a new submit-version KB                   │
│                                                          330    │
└─────────────────────────────────────────────────────────────────┘
                                │
                                ▼
┌─────────────────────────────────────────────────────────────────┐
│ receiving, by the device, a second test request from a KP       │
│ manager and determining whether the new submit-version KB       │
│ passes a second test                                     340    │
└─────────────────────────────────────────────────────────────────┘
                                │
                                ▼
┌─────────────────────────────────────────────────────────────────┐
│ in response to the determination that the new submit-version KB │
│ passes the second test, storing, by the device, an original     │
│ production-version KB as a pervious-version KB and submitting   │
│ the new submit-version KB as a new production-version KB        │
│                                                          350    │
└─────────────────────────────────────────────────────────────────┘
```

FIG. 3

310 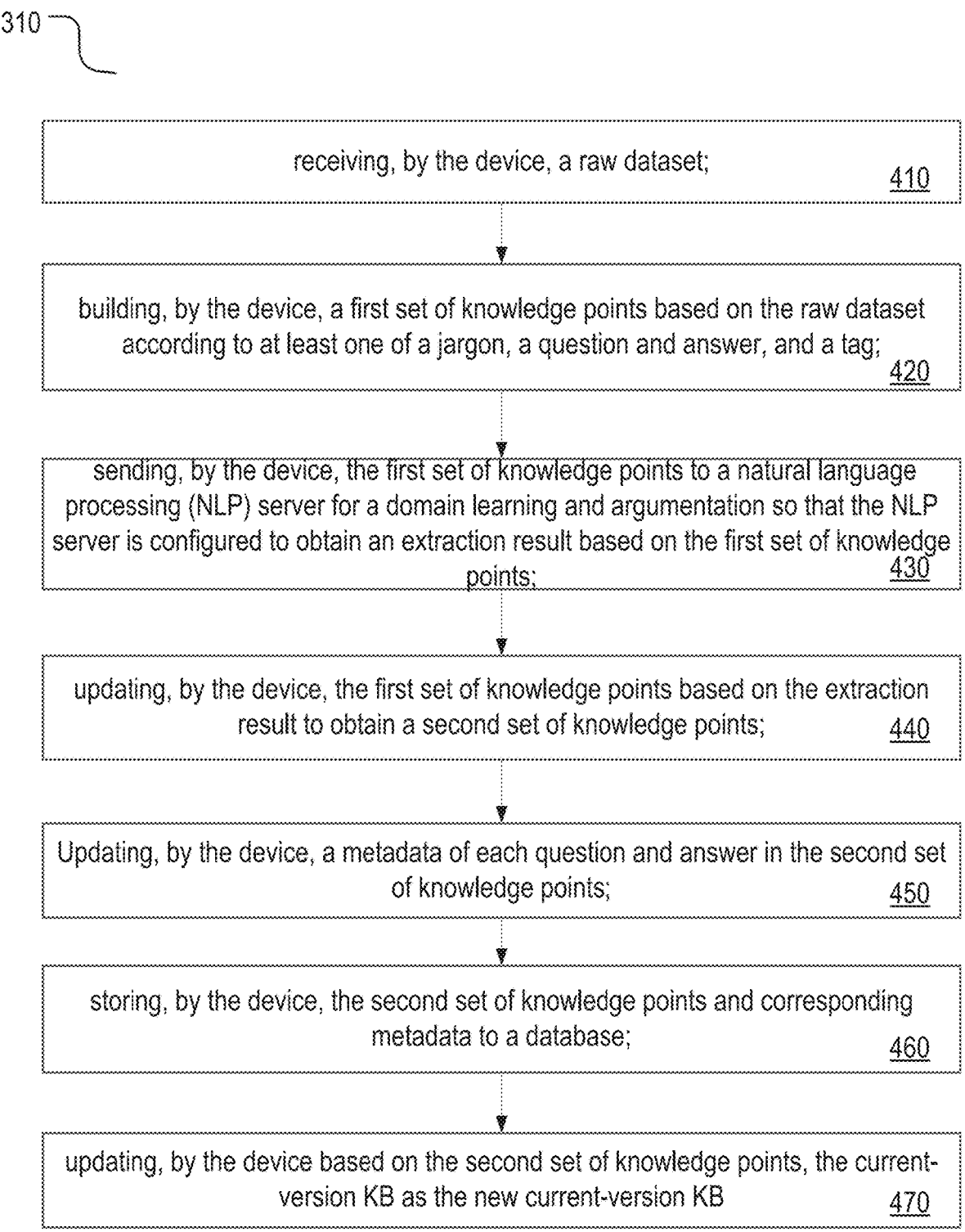

receiving, by the device, a raw dataset;    410 building, by the device, a first set of knowledge points based on the raw dataset according to at least one of a jargon, a question and answer, and a tag;    420 sending, by the device, the first set of knowledge points to a natural language processing (NLP) server for a domain learning and argumentation so that the NLP server is configured to obtain an extraction result based on the first set of knowledge points;    430 updating, by the device, the first set of knowledge points based on the extraction result to obtain a second set of knowledge points;    440

Updating, by the device, a metadata of each question and answer in the second set of knowledge points;    450 storing, by the device, the second set of knowledge points and corresponding metadata to a database;    460 updating, by the device based on the second set of knowledge points, the current-version KB as the new current-version KB    470

| | 510 | 520 | 530 | 540 |
|---|---|---|---|---|
| | T1 | T2 | Question | Answer |
| 560 | Menu | Japanese | What Japanese dishes do you have? | Our Japanese menu... |
| | | Vegetarian | Do you offer vegetarian option? | Our vegan menu... |
| | | Cake | Do you serve cakes? | Our cake menu... |
| | | | ... | |

FIG. 5

| T1 | T2 | T3 | T(n) | Question | Answer |
|---|---|---|---|---|---|
| General Banking | Saving Account | Apply | | How to apply saving account? | You can apply by:... |
| | Address | Shatin | | What is location of Shatin branch? | Shatin branch address:... |
| | | Tai Wai | | What is location of Tai Wai branch? | Tai Wai branch address:... |
| Securities | Securities Account | Apply | | How to apply securities account? | Easy steps to open... |
| | | Fee | | What is the fee of securities trading? | Typical fees range... |
| | | Trading | | How to buy and sell securities? | The ways of... |
| | | | | ... | |

FIG. 9

| Action | Current-version KB | Submit-version KB | Production-version KB | Previous-version KB |
|---|---|---|---|---|
| Service operator add KP set A | ①②③ | | | |
| Service operator submit changes | ①②③ | ①②③ | | |
| Service manager approve changes | ①②③ | ①②③ | ①②③ | |
| Service operator add KP set B | ①②③ ④⑤ | ①②③ | ①②③ | |
| Service operator submit changes | ①②③ ④⑤ | ①②③ ④⑤ | ①②③ | |
| Service manager approve changes | ①②③ ④⑤ | ①②③ ④⑤ | ①②③ ④⑤ | ①②③ |
| Service operator change set A | ①❷③ ④⑤ | ①②③ ④⑤ | ①②③ ④⑤ | ①②③ |
| Service operator submit changes | ①❷③ ④⑤ | ①❷③ ④⑤ | ①②③ ④⑤ | ①②③ |
| Service manager reject changes | ①②③ ④⑤ | ①②③ ④⑤ | ①②③ ④⑤ | ①②③ |

FIG. 10

CHATBOT SYSTEM WITH MODEL LIFECYCLE MANAGEMENT

FIELD OF THE TECHNOLOGY

The present disclosure relates to chatbot systems, and is particularly directed to chatbot systems with model lifecycle management (MLM).

BACKGROUND OF THE DISCLOSURE

A chatbot system, as one of many types of artificial intelligence (AI) assistants, may assist users with questions and provide answers on suggestions, directions, and/or other useful information. Along with development of big data analysis, machine learning, and natural language processing (NLP) technologies, chatbot systems have been making remarkable progress to infer the correct answer based on analysis of user's chat content, to predict the next question to provide a chat service. Recently, the chatbot systems are expanding to applications that handle various operations, such as shopping, ordering and payment.

There may be many issues and problems associated with existing chatbot systems. For example, it is not easy to quickly resolve an issue when a failure occurs during system operation or additional requirements are generated by a client.

The present disclosure describes systems, methods, and products for providing chatbot systems with model lifecycle management (MLM), which may overcome some of the challenges and drawbacks discussed above, improving overall performance, particularly knowledge management and version control of chatbot systems.

SUMMARY OF THE INVENTION

Embodiments of the present disclosure include methods, devices, and computer readable medium for the chatbot systems with model lifecycle management (MLM).

According to an aspect of the embodiments of the present disclosure, a method for managing lifecycle of a knowledge base (KB) in a chatbot system is described. The method includes receiving, by a device, an update request and updating a current-version KB as a new current-version KB. The device includes a memory storing instructions and a processor in communication with the memory. The method also includes receiving, by the device, a first test request from a knowledge point (KP) operator and determining whether the new current-version KB passes a first test; and in response to the determination that the new current-version KB passes the first test, submitting, by the device, the new current-version KB as a new submit-version KB. The method further includes receiving, by the device, a second test request from a KP manager and determining whether the new submit-version KB passes a second test; and in response to the determination that the new submit-version KB passes the second test, storing, by the device, an original production-version KB as a pervious-version KB and submitting the new submit-version KB as a new production-version KB.

According to an aspect of the embodiments of the present disclosure, a device for managing lifecycle of a knowledge base (KB) in a chatbot system is described. The device includes a memory storing instructions and a processor in communication with the memory. When the processor executes the instructions, the processor is configured to cause the device to receive an update request and update a current-version KB as a new current-version KB. When the processor executes the instructions, the processor is configured to further cause the device to receive a first test request from a KP operator and determine whether the new current-version KB passes a first test, and in response to the determination that the new current-version KB passes the first test, submit the new current-version KB as a new submit-version KB. When the processor executes the instructions, the processor is configured to cause the device to receive a second test request from a KP manager and determine whether the new submit-version KB passes a second test; and in response to the determination that the new submit-version KB passes the second test, store an original production-version KB as a pervious-version KB and submit the new submit-version KB as a new production-version KB.

According to an aspect of the embodiments of the present disclosure, a non-transitory computer readable storage medium storing instructions is described. The instructions, when executed by a processor, cause the processor to perform receiving an update request and updating a current-version KB as a new current-version KB. The instructions, when executed by the processor, further cause the processor to perform receiving a first test request from a KP operator and determining whether the new current-version KB passes a first test; and in response to the determination that the new current-version KB passes the first test, submitting the new current-version KB as a new submit-version KB. The instructions, when executed by the processor, cause the processor to perform receiving a second test request from a KP manager and determining whether the new submit-version KB passes a second test; and in response to the determination that the new submit-version KB passes the second test, storing an original production-version KB as a pervious-version KB and submitting the new submit-version KB as a new production-version KB.

The above and other aspects and their implementations are described in greater details in the drawings, the descriptions, and the claims.

BRIEF DESCRIPTION OF THE DRAWINGS

The system and method described below may be better understood with reference to the following drawings and description of non-limiting and non-exhaustive embodiments. The components in the drawings are not necessarily to scale. Emphasis instead is placed upon illustrating the principles of the disclosure.

FIG. 3 shows a flow diagram of embodiments for managing lifecycle of a knowledge base (KB) in a chatbot system.

FIG. 4 shows a flow diagram of embodiments for step 310 in FIG. 3.

FIG. 5 shows an exemplary table processed in embodiments for managing model lifecycle in a chatbot system.

FIG. 9 shows another exemplary table processed in embodiments for managing model lifecycle in a chatbot system.

FIG. 10 shows an exemplary action table of managing model lifecycle in a chatbot system.

DETAILED DESCRIPTION

Figure 1:
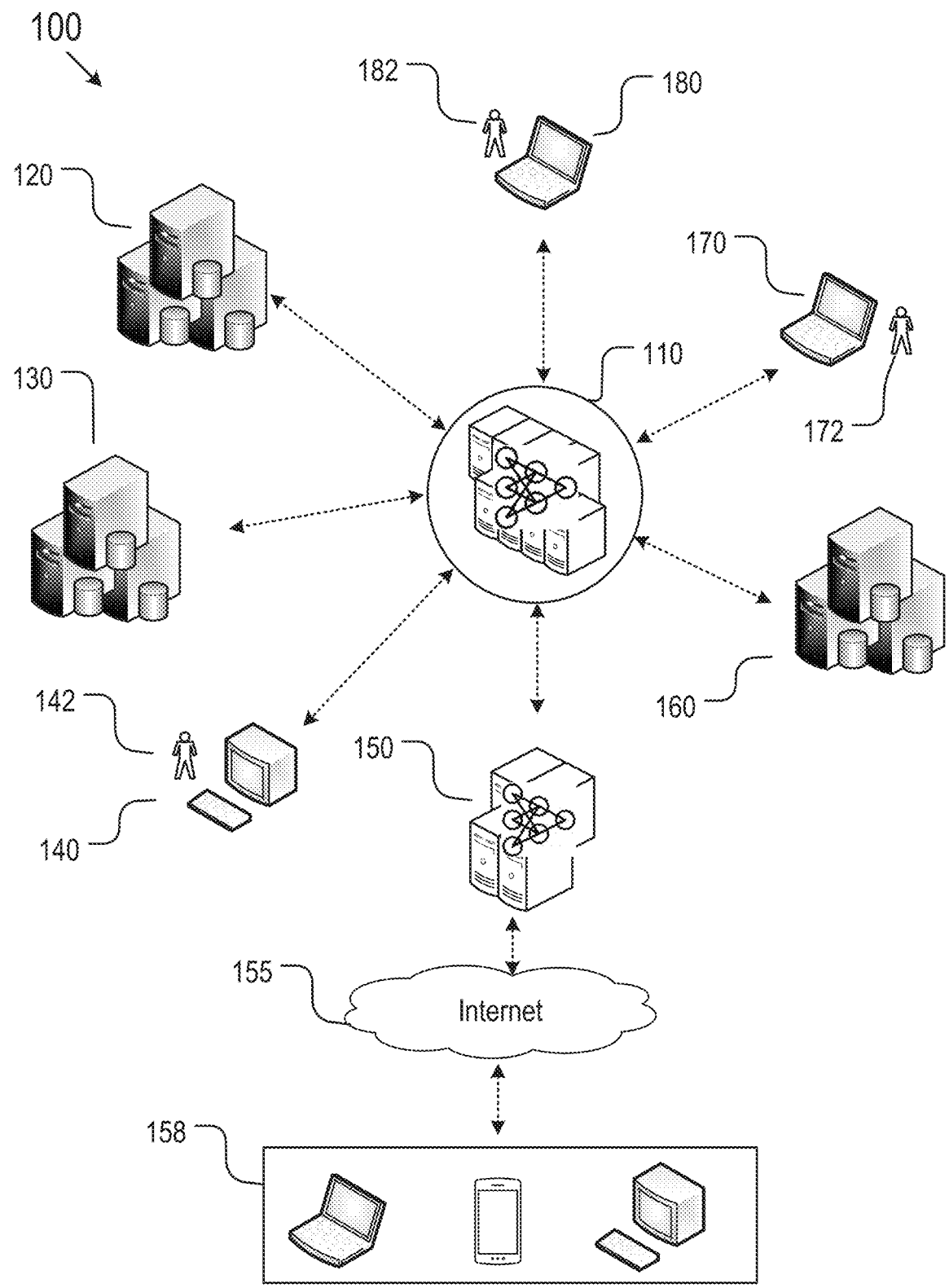
FIG. 1 shows an exemplary electronic communication environment for implementing a chatbot systems with model lifecycle management (MLM).

The method will now be described with reference to the accompanying drawings, which show, by way of illustration, specific exemplary embodiments. The method may, however, be embodied in a variety of different forms and, therefore, covered or claimed subject matter is intended to be construed as not being limited to any exemplary embodiments set forth. The method may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes systems, methods, and devices for chatbot systems management with model lifecycle management (MLM).

A chatbot system may be deployed with intelligent algorithms working in the background to assist users with inquiries and provide suggestions, directions, and other useful information. With the recent advance of big data analysis, machine learning, and natural language processing technology, the chatbot system may infer correct answer based on analysis of user's chat content, predict next questions to provide a chat service, and may expand to applications that handle various operations, such as shopping, ordering, and payment.

The chatbot system may have some issues and/or problems, which may be solved to improve the performance of chatbot systems and mitigate managing difficulties/burdens of chatbot systems. The issues and/or problems may include that a service owner needs to parse each question in a knowledge point in a syntactic way that chatbot system understand, which is not easily handled by the service owner since the service owner typically is a normal, non-technical user. For example, the service owner may not know how to parse each question and/or to define entries in a knowledge point (KP). The issues and/or problems may also include that a service owner needs to input many questions (e.g., may be hundreds or thousands of questions) for a single knowledge point. For example, a service owner may need to answer uncountable questions when there are thousands of KPs. The issues and/or problems may further include a service owner needs to define the complex flows when there are many KPs. The issues and/or problems may further include a service owner may have only a few version control on any change of KPs, especially after deployment to production environment. For example, a service owner may have difficulty in modifying/controlling/updating a deployed knowledge base for a chatbot system when there is any knowledge point change. For another example, when there are errors in the deployed production version, a service owner may have no easy way to resolve the errors. For another example, it is not easy for a service owner to solve a failure quickly when the failure occurs during system operation or additional requirements are generated by a client.

The present disclosure describes embodiments of devices, methods, and systems for chatbot systems with model lifecycle management (MLM) for solving at least one of the issues and/or problems discussed above, and thus improving the performance of chatbot systems.

The present disclosure describes embodiments of chatbot systems with MLM so that a service owner may manage his/her own knowledge base in a very simple format to maintain the chatbot service, and/or manage the chatbot system on his/her own easily and instantly if a failure occurs in the system. Using the chatbot system with MLM, a service owner may only need to input a few questions for a single KP, may not be required to define a dialog flow, and/or may have version control before and after deployment of new KPs and/or KBs.

FIG. 1 shows an exemplary electronic communication environment 100 in which a chatbot system with MLM may be implemented. The electronic communication environment 100 may include a chatbot system with MLM 110. In other implementation, the chatbot system 110 may be implemented as a central server or a plurality of servers distributed in the communication networks.

The electronic communication environment 100 may also include a portion or all of the following: one or more databases 120, one or more natural language processing (NLP) servers 130, one or more user devices (or terminals, 140, 170, and 180) associated with one or more users (142, 172, and 182), one or more application servers 150, one or more speech recognition engine (SRE) servers 160. Any one of the above components may be in direct communication with each other via public or private communication networks, so that they may communicate with each other without via a third party. For example but not limited to, the database 120 may communicate with the NLP server 130 without via the chatbot system with MLM 110.

Referring to FIG. 1, one or more clients 158 may communicate with the application server 150 via any types of communication system, for example, an internet 155. The client 158 may send inquiry to the chatbot system via the application server 150. The client 158 may include, but not limited to, a mobile application, a website interface, an instant messenger (IM).

FIG. 1 shows an implementation in which the chatbot system with MLM is implemented on different servers from the database, NLP server, SRE server, or application server. In other implementations, the chatbot system with MLM, one or more databases, one or more NLP servers, one or more SRE servers, and/or one or more application servers may be implemented or installed on a single computer system, or one server comprising multiple computer systems, or multiple distributed servers comprising multiple computer systems, or one or more cloud-based servers or computer systems.

The user devices/terminals (140, 170, and 180) may be any form of mobile or fixed electronic devices including but not limited to desktop personal computer, laptop computers, tablets, mobile phones, personal digital assistants, and the like. The user devices/terminals may be installed with a user interface for accessing the chatbot system with MLM.

The database may be hosted in a central database server, a plurality of distributed database servers, or in cloud-based database hosts. The database 120 may be configured to store the intermediate data and/or final results for implementing the chatbot system with MLM, for example but not limited to, various versions of knowledge points and/or various versions of knowledge bases.

Figure 2:
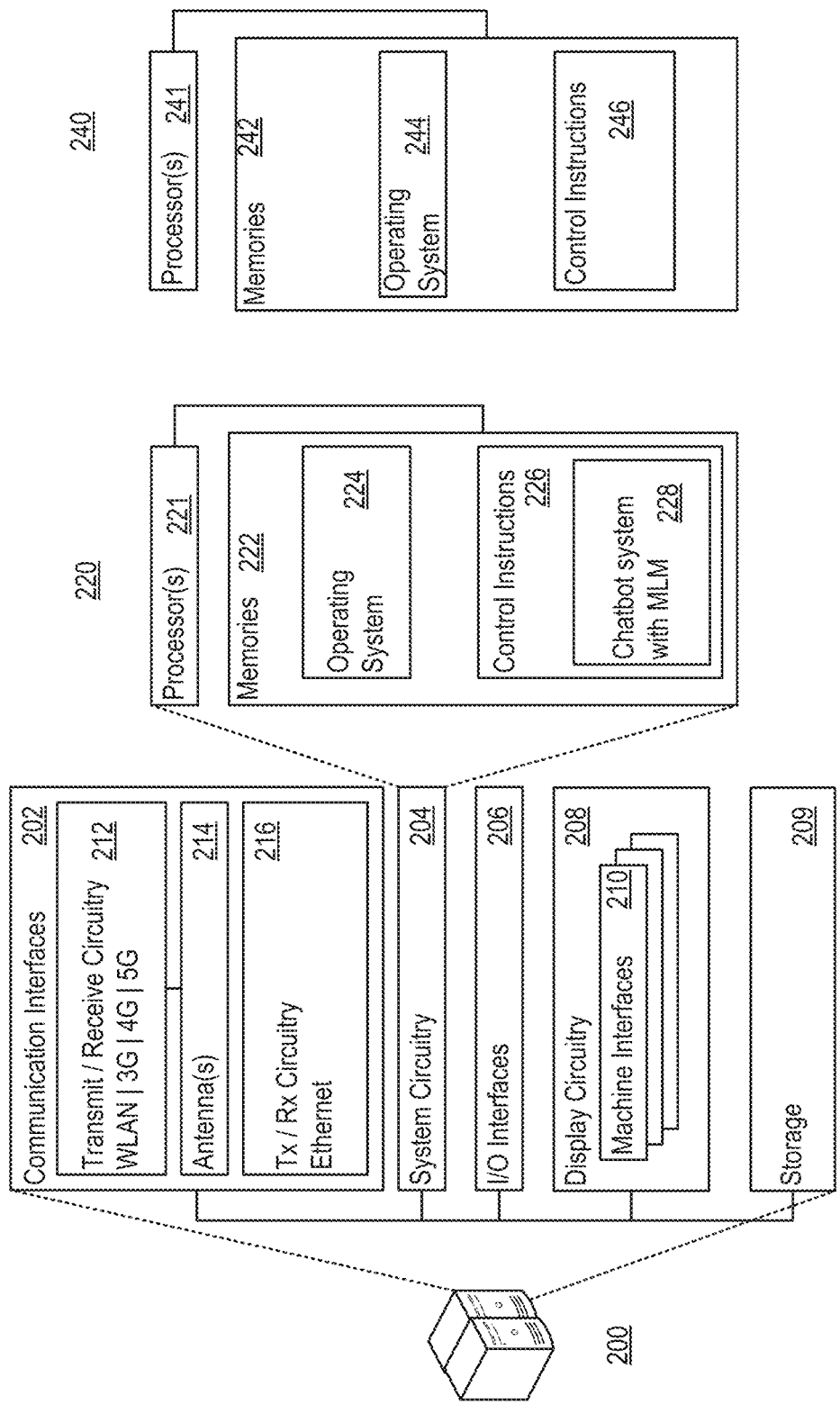
FIG. 2 shows computer systems that may be used to implement various components of the electronic communication environment of FIG. 1.

FIG. 2 shows an exemplary device, for example, a computer system 200, for implementing the chatbot system with MLM 110, the application server 150, or the user devices (140, 170, and 180). The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The transceivers 212 and antennas 214 may support mobile network communications, for example, 3G, 4G, and 5G communications. The communication interfaces 202 may also include wireline transceivers 216, for example, Ethernet communications.

The storage 209 may be used to store various initial, intermediate, or final data or model for implementing the chatbot system with MLM. These data corpus may alternatively be stored in the database 120 of FIG. 1. In one implementation, the storage 209 of the computer system 200 may be integral with the database 120 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, the system circuitry 204 may be implemented as 220 for the chatbot system with MLM 110 of FIG. 1. The system circuitry 220 of the chatbot system with MLM may include one or more processors 221 and memories 222. The memories 222 stores, for example, control instructions 226 and an operating system 224. The control instructions 226, for example may include instructions for implementing the components 228 of chatbot systems with MLM. In one implementation, the instruction processors 221 execute the control instructions 226 and the operating system 224 to carry out any desired functionality related to the chatbot system with MLM.

Likewise, the system circuitry 204 may be implemented as 240 for the user devices 120, 140, and 180 of FIG. 1. The system circuitry 240 of the user devices may include one or more instruction processors 241 and memories 242. The memories 242 stores, for example, control instructions 246 and an operating system 244. The control instructions 246 for the user devices may include instructions for implementing a communication interface with the chatbot system with MLM. In one implementation, the instruction processors 241 execute the control instructions 246 and the operating system 244 to carry out any desired functionality related to the user devices.

Referring to FIG. 3, the present disclosure describes embodiments of a method 300 for managing lifecycle of a knowledge base (KB) in a chatbot system. The chatbot system may be a chatbot system with model lifecycle management (MLM). The method 300 may be implemented by the device shown in FIG. 2. The method 300 may include a portion or all of the following steps: step 310: receiving, by a device comprising a memory storing instructions and a processor in communication with the memory, an update request and updating a current-version KB as a new current-version KB in a chatbot system; step 320: receiving, by the device, a first test request from a service operator (or KP operator, or operator) and determining whether the new current-version KB passes a first test; step 330: in response to the determination that the new current-version KB passes the first test, submitting, by the device, the new current-version KB as a new submit-version KB; step 340: receiving, by the device, a second test request from a service manager (or KP manager, or manager) and determining whether the new submit-version KB passes a second test; and step 350: in response to the determination that the new submit-version KB passes the second test, storing, by the device, an original production-version KB as a pervious-version KB and submitting the new submit-version KB as a new production-version KB. The previous versions of KBs may be properly stored by the chatbot system, so that when any issue appears, the chatbot system may revert back to its original versions of KBs. The issue may include but not limited to that operation errors emerges to be associated the new production-version KB.

Referring to step 310, the device may receive an update request from a service owner and update a current-version knowledge base (KB) as a new current-version KB. A KB may include one or more knowledge points (KPs). In one implementation, a KB may include hundreds or even thousands of KPs. According to the update request, the current-version KB of the chatbot system may be updated and the updated KB may be referred as the new current-version KB. In another implementation, before the current-version KB is updated, the current-version KB may be stored by the chatbot system, so that, if the updated KB has any issue, a KB operator may still revise/update the current-version KB anytime before the first test.

The update request may include a request to modify one or more existing KPs, add one or more new KPs, remove one or more existing KPs, or any possible combination of herein.

In one implementation, the service owner may include a KP operator. The KP operator may not be a technical person but with knowledge of KPs and skills about managing and/or updating KPs on the chatbot system. In another implementation, the service owner may include a KP manager. The KP manager may be a non-technical person managing the chatbot system operation, who may have little or minimal technical training with the chatbot system.

Referring to FIG. 4, the step 310 may include a portion or all of the following steps: step 410: receiving, by the device, a raw dataset; step 420: building, by the device, a first set of knowledge points based on the raw dataset according to at least one of a jargon, a question and answer, and a tag; step 430: sending, by the device, the first set of knowledge points to a natural language processing (NLP) server for a domain learning and argumentation so that the NLP server is configured to obtain an extraction result based on the first set of knowledge points; step 440: updating, by the device, the first set of knowledge points based on the extraction result to obtain a second set of knowledge points; step 450: updating, by the device, a metadata of each question and answer in the second set of knowledge points; step 460: storing, by the device, the second set of knowledge points and corresponding metadata to a database; and step 470: updating, by the device based on the second set of knowledge points, the current-version KB as the new current-version KB.

Referring to step 410, the device may receive a raw dataset. The raw dataset may include a spreadsheet file (e.g., an Excel file) include one or more questions and answers. According to the update request, the one or more questions and answers may modify one or more existing KPs, add one or more new KPs, or remove one or more KPs. FIG. 5 shows one example of a table 500 including one or more knowledge points based on a raw dataset. The table 500 may include multiple entries 560, and each entry may include at least one of a level-1 topic (T1) 510, a level-2 topic (T2) 520, a question 530, and an answer 540 to the question. The T1 510 is a higher-level tag than the T2 520, indicating the T1 has a broader scope than the T2. For example, the T1 may be "Menu", and the T2 may be a submenu, for example, a "Cake" submenu.

Referring to step 420, the device may build a first set of knowledge points based on the raw dataset according to at least one of a jargon, a question and answer, and a tag. Referring to step 430, the device may send the first set of knowledge points to a natural language processing (NLP) server for a domain learning and argumentation so that the NLP server is configured to obtain an extraction result based on the first set of knowledge points. Referring to step 440, the device may update the first set of knowledge points based on the extraction result to obtain a second set of knowledge points. For example, when the original question is "what is XYZ?", an argumentation may include one or more related questions including but not limited to, "tell me about XYZ?", "what does XYZ mean?", or "any information about XYZ?".

Referring to step 450, the device may update a metadata of each question and answer in the second set of knowledge points. Referring to step 460, the device may store the second set of knowledge points and corresponding metadata to a database. Referring to step 470, the device may update, based on the second set of knowledge points, the current-version KB as the new current-version KB.

Referring to step 320 in FIG. 3, the device may receive a first test request from a KP operator. The first test request may indicate the chatbot system to perform a first test. The device may perform the first test on the new current-version KB and determine whether the new current-version KB passes the first test.

In one embodiment, the step 320 may include a portion or all of the following steps: step 610: receiving, by the device, a question from the KP operator; step 620: returning, by the device, an answer to the question based on the new current-version KB; step 630: receiving, by the device, a first determination whether it is necessary to change the answer from the KP operator; step 640: in response to receiving the first determination that it is necessary to change the answer, locating, by the device, a related question as the question; step 650: receiving, by the device, a second determination whether it is necessary to add the question to the answer from the KP operator; step 660: in response to receiving the second determination that it is necessary to add the question to the answer, adding, by the device, the question to the answer; step 670: determining, by the device, whether it is necessary to continue the first test; step 680: in response to determining that it is necessary to continue the first test, repeating, by the device, the step of receiving a question from the KP operator; and step 690: in response to determining that it is not necessary to continue the first test, determining, by the device, that the new current-version KB passes the first test.

Figure 6:
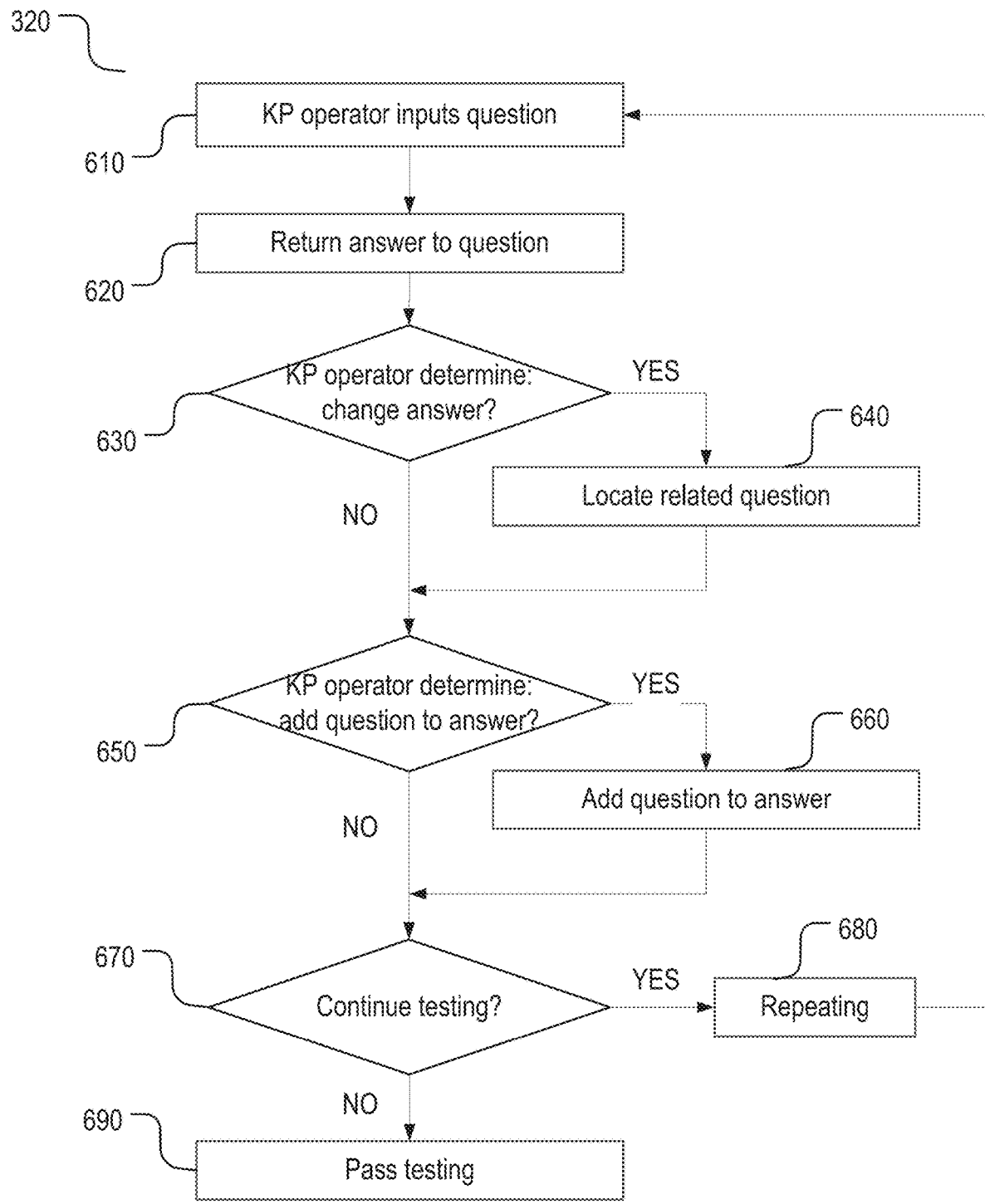
FIG. 6 shows a block diagram of embodiments for step 320 in FIG. 3.

Referring to step 610 in FIG. 6, a KP operator may input a question to the chatbot system. The question may be a question used by the KP operator to test any technical errors related to the new current-version KB. Referring to step 620 in FIG. 6, upon receiving the question from the KP operator, the chatbot system may return an answer to the question. The chatbot system may send the answer to a user device that displays the answer to the KP operator.

Referring to step 630 in FIG. 6, the KP operator may determine whether it is necessary to change the answer, which may refer to as a first determination. The KP operator may send the first determination to the chatbot system. Referring to step 640 in FIG. 6, in response to receiving the first determination that it is necessary to change the answer, the chatbot system may locate a related question, and use the related question to replace the previous question. In response to receiving the first determination that it is not necessary to change the answer, step 650 may directly follow step 630.

Referring to step 650 in FIG. 6, the KP operator may further determine whether it is necessary to add the question to the answer, which may refer to as a second determination. The KP operator may send the second determination to the chatbot system. Referring to step 660 in FIG. 6, in response to receiving the second determination that it is necessary to add the question to the answer, the chatbot system may add the question to the answer. In response to receiving the second determination that it is not necessary to add the question to the answer, step 670 may follow step 650.

Referring to step 670 in FIG. 6, the chatbot system may determine whether it is necessary to continue the first test. In one implementation, there may be a preset repetition threshold N no smaller than 1, and, when the repeating time is smaller than the preset repetition threshold, the chatbot system may determine that it is necessary to continue the first test; when the current repeating time is not smaller than the preset repetition threshold, the chatbot system may determine that it is not necessary to continue the first test. In another implementation, the chatbot system may receive instructions from the KP operator to decide whether a condition is satisfied. When the condition is satisfied, the chatbot system may determine that it is not necessary to continue the first test. When the condition is not satisfied, the chatbot system may determine that it is necessary to continue the first test.

Referring to step 680 in FIG. 6, in response to determining that it is necessary to continue the first test, the chatbot system may repeat again, i.e., re-starting step 610: receiving another question from the KP operator.

Referring to step 690 in FIG. 6, in response to determining that it is not necessary to continue the first test, the chatbot system may determine that the new current-version KB passes the first test.

Referring to step 330 in FIG. 3, in response to the determination that the new current-version KB passes the first test, the device may submit the new current-version KB as a new submit-version KB.

Referring to step 340 in FIG. 3, the device may receive a second test request from a KP manager. The second test request may indicate the chatbot system to perform a second test. The device may perform the second test on the new submit-version KB and determine whether the new submit-version KB passes the first test.

In one embodiment, the step 340 may include a portion or all of the following steps: step 710: receiving, by the device, a question from the KP manager; step 720: returning, by the device, an answer to the question based on the new submit-version KB; step 730: receiving, by the device, a first determination whether it is necessary to change the answer from the KP manager; step 750: receiving, by the device, a second determination whether it is necessary to add the question to the answer from the KP manager; step 770: determining, by the device, whether it is necessary to continue the second test; step 780: in response to determining that it is necessary to continue the second test, repeating, by the device, the step of receiving a question from the KP manager; and step 790: in response to determining that it is not necessary to continue the second test, determining, by the device, that the new submit-version KB passes the second test. In one implementation, the KP manager may not be allowed to change/update the submit-version KB as there is no further testing/verification step for those changes/updates. Optionally in another implementation, the step may include step 740: in response to receiving the first determination that it is necessary to change the answer, locating, by the device, a related question as the question; and step 760: in response to receiving the second determination that it is necessary to add the question to the answer, adding, by the device, the question to the answer.

Figure 7:
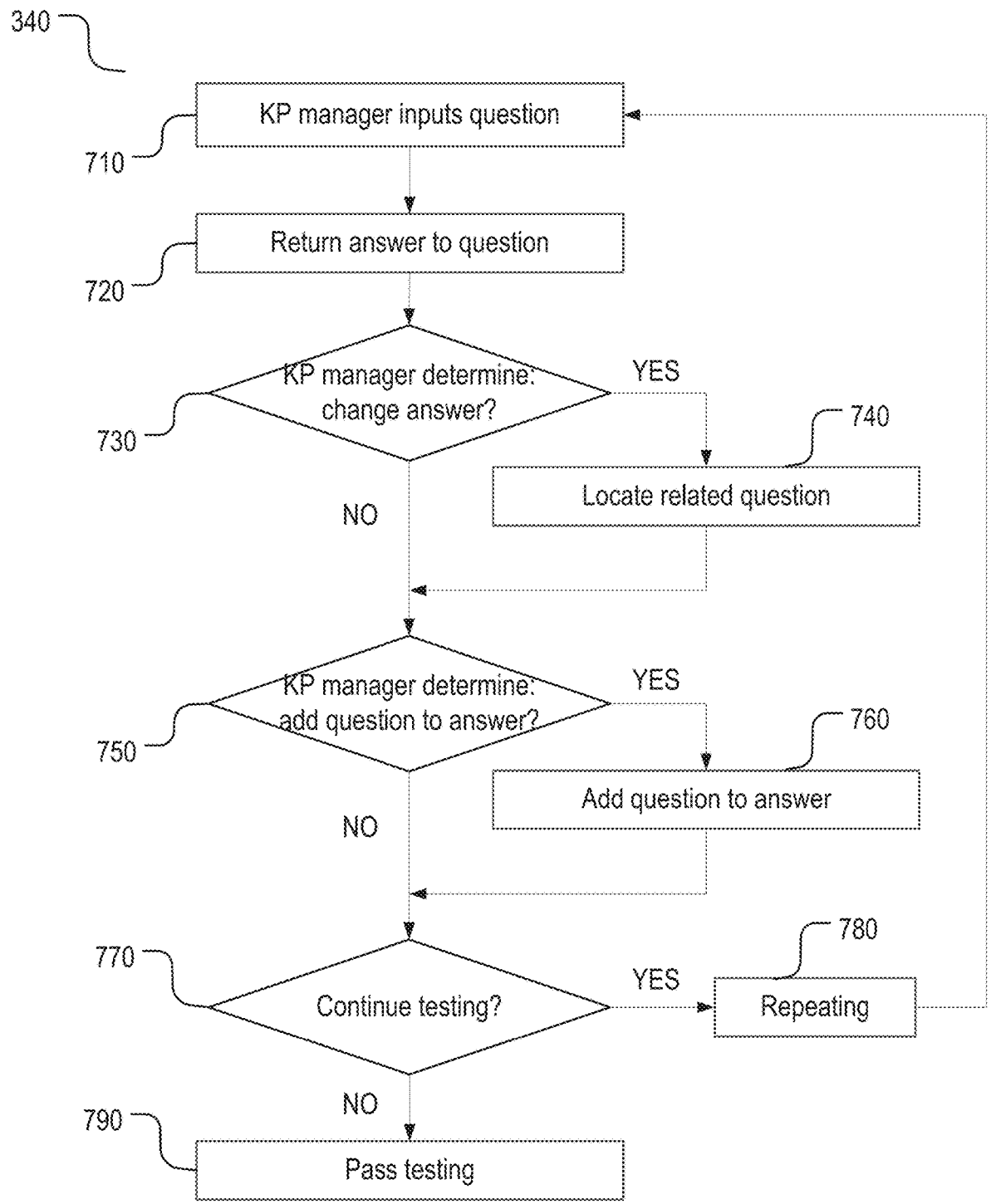
FIG. 7 shows a block diagram of embodiments for step 320 in FIG. 3.

Referring to step 710 in FIG. 7, a KP manager may input a question to the chatbot system. The question may be a question used by the KP manager to test any content/information errors related to the new submit-version KB. Referring to step 720 in FIG. 7, upon receiving the question from the KP manager, the chatbot system may return an answer to the question. The chatbot system may send the answer to a user device that displays the answer to the KP manager.

Referring to step 730 in FIG. 7, the KP manager may determine whether it is necessary to change the answer, which may refer to as a first determination. The KP manager may send the first determination to the chatbot system. In response to receiving the first determination that it is not necessary to change the answer, step 750 may directly follow step 730. Optionally in another implementation, referring to step 740 in FIG. 7, in response to receiving the first determination that it is necessary to change the answer, the chatbot system may locate a related question, and use the related question to replace the previous question.

Referring to step 750 in FIG. 7, the KP manager may further determine whether it is necessary to add the question to the answer, which may refer to as a second determination. The KP manager may send the second determination to the chatbot system. In response to receiving the second determination that it is not necessary to add the question to the answer, step 770 may follow step 750. Optionally in another implementation, referring to step 760 in FIG. 7, in response to receiving the second determination that it is necessary to add the question to the answer, the chatbot system may add the question to the answer.

Referring to step 770 in FIG. 7, the chatbot system may determine whether it is necessary to continue the second test. In one implementation, there may be a preset repetition threshold N no smaller than 1, and, when the repeating time is smaller than the preset repetition threshold, the chatbot system may determine that it is necessary to continue the second test; when the current repeating time is not smaller than the preset repetition threshold, the chatbot system may determine that it is not necessary to continue the second test. In another implementation, the chatbot system may receive instructions from the KP manager to decide whether a condition is satisfied. When the condition is satisfied, the chatbot system may determine that it is not necessary to continue the second test. When the condition is not satisfied, the chatbot system may determine that it is necessary to continue the second test.

Referring to step 780 in FIG. 7, in response to determining that it is necessary to continue the second test, the chatbot system may repeat again, i.e., re-starting step 710: receiving another question from the KP manager.

Referring to step 790 in FIG. 7, in response to determining that it is not necessary to continue the second test, the chatbot system may determine that the new submit-version KB passes the second test.

Referring to step 350 in FIG. 3, in response to the determination that the new submit-version KB passes the second test, the device may store an original production-version KB as a pervious-version KB and publish/promote the new submit-version KB as a new production-version KB. Since that the original production-version KB was stored by the system as the pervious-version KB, when any issues arise with the new production-version KB, the KP manager has the option of reverting back to the previous version/state of the chatbot system.

In another embodiment, the method 300 in FIG. 3 may further include determining, by the device, whether the new production-version KB has an issue; and in response to the determination that the new production-version KB has the issue, replacing, by the device, the new production-version KB by the stored previous-version KB.

Figure 8:
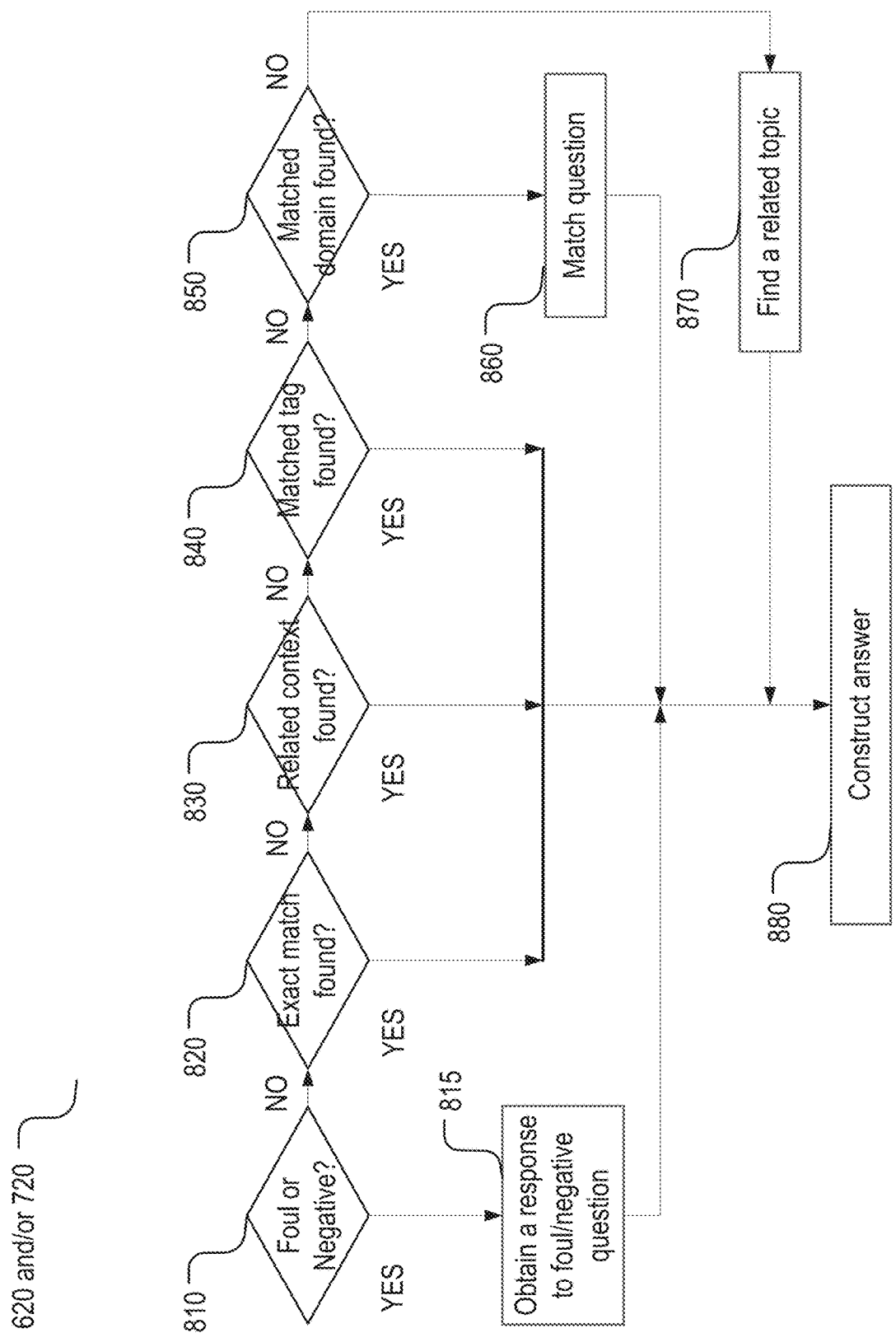
FIG. 8 shows a block diagram of embodiments for step 620 in FIG. 6 and/or 720 in FIG. 7.

In another embodiment, referring to FIG. 8, step 620 and/or step 720 may further include a portion or all of the following steps: step 810: determining, by the device, whether the question has foul or is negative; step 815: in response to determining that the question has foul or is negative, obtaining, by the device, a response to a foul or negative question; step 820: in response to determining that the question does not have foul and is not negative, determining, by the device, whether an exact match to the question is found based on the new current-version KB; step 830: in response to determining that the exact match to the question is not found, determining, by the device, whether a related context to the question is found based on the new current-version KB; step 840: in response to determining that the related context to the question is not found, determining, by the device, whether a matched tag to the question is found based on the new current-version KB; step 850: in response to determining that the matched tag to the question is not found, determining, by the device, whether a matched domain to the question is found based on the new current-version KB; step 860: in response to determining that the matched domain to the question is found, matching, by the device, the question based on the new current-version KB, and step 870: in response to determining that the matched domain to the question is not found, finding, by the device, a related topic to the question based on the new current-version KB; and step 880: constructing, by the device, the answer to the question.

FIG. 9 shows one example of a table 900 describing a dynamic dialog builder. The chatbot system may dynamically define a flow according to user enquires based on the knowledge points. The table 900 may include multiple entries 960, and each entry may include at least one of a level-1 topic (T1) 910, a level-2 topic (T2) 912, a level-3 topic (T3) 914, a level-n topic (T(n)) 916, a question 930, and an answer 940 to the question. The T1 910 is a higher-level topic than the T2 912; the T2 is a higher-level topic than the T3 914; and the T3 is a higher-level topic than T(n).

In one implementation, referring to step 840, the chatbot system may search tags with different levels to match the question, and the search sequence may be from higher levels to lower levels, for example, in a sequence of T1, T2, T3, etc.

In one implementation, referring to step 850, the chatbot system search various domains to match to the question. For example, the chatbot system may return domain "restaurant" for question about "table reservation". For another example, the chatbot system may return "restaurant" and "bank" for questions about "latest promotion".

In some embodiments, FIG. 10 shows an exemplary action table 1000 of managing KP lifecycle. The action table 1000 may include columns of actions 1010, current-version KBs 1020, submit-version KBs 1030, production-version KBs 1040, and previous-version KBs 1050.

Referring to the entry 1061 in the action table 1000, a KP operator may add a new set of KPs (set A) as a new current-version KB. The set A of KPs may include KP #1, KP #2, and KP #3.

Referring to the entry 1063 in the action table 1000, in response to the determination that the new current-version KB passes the first test, the KP operator may submit the new current-version KB including the set A as a new submit-version KB.

Referring to the entry 1065 in the action table 1000, in response to the determination that the new submit-version KB passes the second test, a KP manager may approve the changes by submitting the new submit-version KB including the set A as a new production-version KB. Thus, after actions in entries 1061, 1063, and 1065, the chatbot system includes the production-version KB including the set A.

Referring to the entry 1067 in the action table 1000, the KP operator may add another set of KPs (set B) to the current-version KB and update the current-version KB as a new current-version KB. The set B of KPs may include KP #4 and KP #5. The new current-version KB may include the set A and the set B.

Referring to the entry 1069 in the action table 1000, in response to the determination that the new current-version KB passes the first test, the KP operator may submit the new current-version KB including the set A and the set B as a new submit-version KB.

Referring to the entry 1071 in the action table 1000, in response to the determination that the new submit-version KB passes the second test, the KP manager may approve the changes by: storing the previous production-version KB as a pervious-version KB and submitting the new submit-version KB including the set A and the set B as a new production-version KB. Thus, after actions in entries 1061-1071, the chatbot system includes the production-version KB including the set A and the set B.

Referring to the entry 1073 in the action table 1000, the KP operator may modify the set A in the current-version KB and update the current-version KB as a new current-version KB. The modification to the set A may include changes of KP #2 and removal of KP #3. The new current-version KB may include the modified set A and the set B.

Referring to the entry 1075 in the action table 1000, in response to the determination that the new current-version KB passes the first test, the KP operator may submit the new current-version KB including the modified set A and the set B as a new submit-version KB.

Referring to the entry 1077 in the action table 1000, in response to the determination that the new submit-version KB does not pass the second test, the KP manager may reject the changes. When the changes rejected, the chatbot system may revert the submit-version KB and current-version KB. For example, the submit-version KB and current-version KB may be replaced by the production-version KB. In this circumstance, it may return to the state of the entry 1071 as if nothing had change in set A.

Through the descriptions of the preceding embodiments, persons skilled in the art may understand that the methods according to the foregoing embodiments may be implemented by hardware only or by software and a necessary universal hardware platform. However, in most cases, using software and a necessary universal hardware platform are preferred. Based on such an understanding, the technical solutions of the present disclosure essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

While the particular invention has been described with reference to illustrative embodiments, this description is not meant to be limiting. Various modifications of the illustrative embodiments and additional embodiments will be apparent to one of ordinary skill in the art from this description. Those skilled in the art will readily recognize these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A method for managing lifecycle of a knowledge base (KB) in a chatbot system, the method comprising:
receiving, by a device comprising a memory storing instructions and a processor in communication with the memory, an update request and updating a current-version KB as a new current-version KB;
receiving, by the device, a first test request from a knowledge point (KP) operator and determining whether the new current-version KB passes a first test;
in response to the determination that the new current-version KB passes the first test, submitting, by the device, the new current-version KB as a new submit-version KB;
receiving, by the device, a second test request from a KP manager and determining whether the new submit-version KB passes a second test; and
in response to the determination that the new submit-version KB passes the second test, storing, by the device, an original production-version KB as a pervious-version KB and submitting the new submit-version KB as a new production-version KB.

2. The method according to claim 1, wherein the new current-version KB comprises one or more knowledge points.

3. The method according to claim 1, further comprising:
determining, by the device, whether the new production-version KB has an issue; and
in response to the determination that the new production-version KB has the issue, replacing, by the device, the new production-version KB by the stored previous-version KB.

4. The method according to claim 1, wherein receiving the update request and updating the current-version KB as the new current-version KB comprises:
receiving, by the device, a raw dataset;
building, by the device, a first set of knowledge points based on the raw dataset according to at least one of a jargon, a question and answer, and a tag;
sending, by the device, the first set of knowledge points to a natural language processing (NLP) server for a domain learning and argumentation so that the NLP server is configured to obtain an extraction result based on the first set of knowledge points;
updating, by the device, the first set of knowledge points based on the extraction result to obtain a second set of knowledge points;
updating, by the device, a metadata of each question and answer in the second set of knowledge points;
storing, by the device, the second set of knowledge points and corresponding metadata to a database; and
updating, by the device based on the second set of knowledge points, the current-version KB as the new current-version KB.

5. The method according to claim 1, wherein determining whether the new current-version KB passes the first test comprises:
receiving, by the device, a question from the KP operator;
returning, by the device, an answer to the question based on the new current-version KB;
receiving, by the device, a first determination whether it is necessary to change the answer from the KP operator;
in response to receiving the first determination that it is necessary to change the answer, locating, by the device, a related question as the question;
receiving, by the device, a second determination whether it is necessary to add the question to the answer from the KP operator;
in response to receiving the second determination that it is necessary to add the question to the answer, adding, by the device, the question to the answer;
determining, by the device, whether it is necessary to continue the first test;
in response to determining that it is necessary to continue the first test, repeating, by the device, the step of receiving a question from the KP operator; and
in response to determining that it is not necessary to continue the first test, determining, by the device, that the new current-version KB passes the first test.

6. The method according to claim 5, wherein returning the answer to the question based on the new current-version KB comprises:
determining, by the device, whether the question has foul or is negative;
in response to determining that the question has foul or is negative, obtaining, by the device, a response to a foul question;
in response to determining that the question does not have foul and is not negative:
determining, by the device, whether an exact match to the question is found based on the new current-version KB,
in response to determining that the exact match to the question is not found, determining, by the device, whether a related context to the question is found based on the new current-version KB,
in response to determining that the related context to the question is not found, determining, by the device, whether a matched tag to the question is found based on the new current-version KB,
in response to determining that the matched tag to the question is not found, determining, by the device, whether a matched domain to the question is found based on the new current-version KB,
in response to determining that the matched domain to the question is found, matching, by the device, the question based on the new current-version KB, and
in response to determining that the matched domain to the question is not found, finding, by the device, a related topic to the question based on the new current-version KB; and
constructing, by the device, the answer to the question.

7. The method according to claim 1, wherein determining whether the new submit-version KB passes the second test comprises:
receiving, by the device, a question from the KP manager;
returning, by the device, an answer to the question based on the new submit-version KB;
receiving, by the device, a first determination whether it is necessary to change the answer from the KP manager;
in response to receiving the first determination that it is necessary to change the answer from the KP manager, changing, by the device, the answer;
receiving, by the device, a second determination whether it is necessary to add the question to the answer from the KP manager;

in response to receiving the second determination that it is necessary to add the question to the answer from the KP manager, adding, by the device, the question to the answer;

determining, by the device, whether it is necessary to continue the second test;

in response to determining that it is necessary to continue the second test, repeating, by the device, the step of receiving a question from the KP manager; and in response to determining that it is not necessary to continue the second test, determining, by the device, that the new submit-version KB passes the second test.

8. A device for managing lifecycle of a knowledge base (KB) in a chatbot system, the device comprising:
a memory storing instructions; and
a processor in communication with the memory, wherein, when the processor executes the instructions, the processor is configured to cause the device to:
receive an update request and update a current-version KB as a new current-version KB,
receive a first test request from a knowledge point (KP) operator and determine whether the new current-version KB passes a first test,
in response to the determination that the new current-version KB passes the first test, submit the new current-version KB as a new submit-version KB;
receive a second test request from a KP manager and determine whether the new submit-version KB passes a second test; and
in response to the determination that the new submit-version KB passes the second test, store an original production-version KB as a pervious-version KB and submit the new submit-version KB as a new production-version KB.

9. The device according to claim 8, wherein the new current-version KB comprises one or more knowledge points.

10. The device according to claim 8, wherein, when the processor executes the instructions, the processor is configured to further cause the device to:
determine whether the new production-version KB has an issue; and
in response to the determination that the new production-version KB has the issue, replace the new production-version KB by the stored previous-version KB.

11. The device according to claim 8, wherein, when the processor is configured to cause the device to receive the update request and update the current-version KB as the new current-version KB, the processor is configured to cause the device to:
receive a raw dataset;
build a first set of knowledge points based on the raw dataset according to at least one of a jargon, a question and answer, and a tag;
send the first set of knowledge points to a natural language processing (NLP) server for a domain learning and argumentation so that the NLP server is configured to obtain an extraction result based on the first set of knowledge points;
update the first set of knowledge points based on the extraction result to obtain a second set of knowledge points;
update a metadata of each question and answer in the second set of knowledge points;
store the second set of knowledge points and corresponding metadata to a database; and
update, based on the second set of knowledge points, the current-version KB as the new current-version KB.

12. The device according to claim 8, wherein, when the processor is configured to cause the device to determine whether the new current-version KB passes the first test, the processor is configured to cause the device to:
receive a question from the KP operator;
return an answer to the question based on the new current-version KB;
receive a first determination whether it is necessary to change the answer from the KP operator;
in response to receiving the first determination that it is necessary to change the answer, locate a related question as the question;
receive a second determination whether it is necessary to add the question to the answer from the KP operator;
in response to receiving the second determination that it is necessary to add the question to the answer, add the question to the answer;
determine whether it is necessary to continue the first test;
in response to determining that it is necessary to continue the first test, repeat the step to receive a question from the KP operator; and
in response to determining that it is not necessary to continue the first test, determine that the new current-version KB passes the first test.

13. The device according to claim 12, wherein, when the processor is configured to cause the device to return the answer to the question based on the new current-version KB, the processor is configured to cause the device to:
determine whether the question has foul or is negative;
in response to determining that the question has foul or is negative, obtain a response to a foul question;
in response to determining that the question does not have foul and is not negative:
determine whether an exact match to the question is found based on the new current-version KB,
in response to determining that the exact match to the question is not found, determine whether a related context to the question is found based on the new current-version KB,
in response to determining that the related context to the question is not found, determine whether a matched tag to the question is found based on the new current-version KB,
in response to determining that the matched tag to the question is not found, determine whether a matched domain to the question is found based on the new current-version KB,
in response to determining that the matched domain to the question is found, match the question based on the new current-version KB, and
in response to determining that the matched domain to the question is not found, find a related topic to the question based on the new current-version KB; and
construct the answer to the question.

14. The device according to claim 8, wherein, when the processor is configured to cause the device to determine whether the new submit-version KB passes the second test, the processor is configured to cause the device to:
receive a question from the KP manager;
return an answer to the question based on the new submit-version KB;
receive a first determination whether it is necessary to change the answer from the KP manager;

in response to receiving the first determination that it is necessary to change the answer from the KP manager, change the answer;
receive a second determination whether it is necessary to add the question to the answer from the KP manager;
in response to receiving the second determination that it is necessary to add the question to the answer from the KP manager, add the question to the answer;
determine whether it is necessary to continue the second test;
in response to determining that it is necessary to continue the second test, repeat the step to receive a question from the KP manager; and
in response to determining that it is not necessary to continue the second test, determine that the new submit-version KB passes the second test.

15. The device according to claim 14, wherein, when the processor is configured to cause the device to return the answer to the question based on the new submit-version KB, the processor is configured to cause the device to:
determine whether the question has foul or is negative;
in response to determining that the question has foul or is negative, obtain a response of a foul question;
in response to determining that the question does not have foul and is not negative:
determine whether an exact match to the question is found based on the new submit-version KB,
in response to determining that the exact match to the question is not found, determine whether a related context to the question is found based on the new submit-version KB,
in response to determining that the related context to the question is not found, determine whether a matched tag to the question is found based on the new submit-version KB,
in response to determining that the matched tag to the question is not found, determine whether a matched domain to the question is found based on the new submit-version KB,
in response to determining that the matched domain to the question is found, match the question based on the new submit-version KB, and
in response to determining that the matched domain to the question is not found, find a related topic to the question based on the new submit-version KB; and
construct the answer to the question.

16. A non-transitory computer readable storage medium storing instructions, wherein the instructions, when executed by a processor, cause the processor to perform:
receiving an update request and updating a current-version KB as a new current-version KB;
receiving a first test request from a knowledge point (KP) operator and determining whether the new current-version KB passes a first test;
in response to the determination that the new current-version KB passes the first test, submitting the new current-version KB as a new submit-version KB;
receiving a second test request from a KP manager and determining whether the new submit-version KB passes a second test; and
in response to the determination that the new submit-version KB passes the second test, storing an original production-version KB as a pervious-version KB and submitting the new submit-version KB as a new production-version KB.

17. The non-transitory computer readable storage medium according to claim 16, wherein:
the new current-version KB comprises one or more knowledge points;
the instructions, when executed by the processor, cause the processor to further perform:
determining whether the new production-version KB has an issue, and
in response to the determination that the new production-version KB has the issue, replacing the new production-version KB by the stored previous-version KB.

18. The non-transitory computer readable storage medium according to claim 16, wherein, when the instructions cause the processor to perform receiving the update request and updating the current-version KB as the new current-version KB, the instructions cause the processor to perform:
receiving a raw dataset;
building a first set of knowledge points based on the raw dataset according to at least one of a jargon, a question and answer, and a tag;
sending the first set of knowledge points to a natural language processing (NLP) server for a domain learning and argumentation so that the NLP server is configured to obtain an extraction result based on the first set of knowledge points;
updating the first set of knowledge points based on the extraction result to obtain a second set of knowledge points;
updating a metadata of each question and answer in the second set of knowledge points;
storing the second set of knowledge points and corresponding metadata to a database; and
updating, based on the second set of knowledge points, the current-version KB as the new current-version KB.

19. The non-transitory computer readable storage medium according to claim 16, wherein, when the instructions cause the processor to perform determining whether the new current-version KB passes the first test, the instructions cause the processor to perform:
receiving a question from the KP operator;
returning an answer to the question based on the new current-version KB;
receiving a first determination whether it is necessary to change the answer from the KP operator;
in response to receiving the first determination that it is necessary to change the answer, locating a related question as the question;
receiving a second determination whether it is necessary to add the question to the answer from the KP operator;
in response to receiving the second determination that it is necessary to add the question to the answer, adding the question to the answer;
determining whether it is necessary to continue the first test;
in response to determining that it is necessary to continue the first test, repeating the step of receiving a question from the KP operator; and
in response to determining that it is not necessary to continue the first test, determining that the new current-version KB passes the first test.

20. The non-transitory computer readable storage medium according to claim 19, wherein, when the instructions cause the processor to perform returning the answer to the question based on the new current-version KB, the instructions cause the processor to perform:
determining whether the question has foul or is negative;
in response to determining that the question has foul or is negative, obtaining a response to a foul question;

in response to determining that the question does not have foul or is not negative:
  determining whether an exact match to the question is found based on the new current-version KB,
  in response to determining that the exact match to the question is not found, determining whether a related context to the question is found based on the new current-version KB,
  in response to determining that the related context to the question is not found, determining whether a matched tag to the question is found based on the new current-version KB,
  in response to determining that the matched tag to the question is not found, determining whether a matched domain to the question is found based on the new current-version KB,
  in response to determining that the matched domain to the question is found, matching the question based on the new current-version KB, and
  in response to determining that the matched domain to the question is not found, finding a related topic to the question based on the new current-version KB; and
constructing the answer to the question.

21. The non-transitory computer readable storage medium according to claim 16, wherein, when the instructions cause the processor to perform determining whether the new submit-version KB passes the second test, the instructions cause the processor to perform:
  receiving a question from the KP manager;
  returning an answer to the question based on the new submit-version KB;
  receiving a first determination whether it is necessary to change the answer from the KP manager;
  in response to receiving the first determination that it is necessary to change the answer from the KP manager, changing the answer;
  receiving a second determination whether it is necessary to add the question to the answer from the KP manager;
  in response to receiving the second determination that it is necessary to add the question to the answer from the KP manager, adding the question to the answer;
  determining whether it is necessary to continue the second test;
  in response to determining that it is necessary to continue the second test, repeating the step of receiving a question from the KP manager; and
  in response to determining that it is not necessary to continue the second test, determining that the new submit-version KB passes the second test.

22. The non-transitory computer readable storage medium according to claim 21, wherein, when the instructions cause the processor to perform returning the answer to the question based on the new submit-version KB, the instructions cause the processor to perform:
  determining whether the question has foul or is negative;
  in response to determining that the question has foul or is negative, obtaining a response of a foul question;
  in response to determining that the question does not have foul and is not negative:
    determining whether an exact match to the question is found based on the new submit-version KB,
    in response to determining that the exact match to the question is not found, determining whether a related context to the question is found based on the new submit-version KB,
    in response to determining that the related context to the question is not found, determining whether a matched tag to the question is found based on the new submit-version KB,
    in response to determining that the matched tag to the question is not found, determining whether a matched domain to the question is found based on the new submit-version KB,
    in response to determining that the matched domain to the question is found, matching the question based on the new submit-version KB, and
    in response to determining that the matched domain to the question is not found, finding a related topic to the question based on the new submit-version KB; and
  constructing the answer to the question.

* * * * *